United States Patent [19]

Nishiwaki

[11] Patent Number: 4,917,619
[45] Date of Patent: Apr. 17, 1990

[54] TOOL CHANGER FOR WELDING ROBOT

[75] Inventor: Toshihiro Nishiwaki, Kanagawa, Japan

[73] Assignee: Obara Corporation, Tokyo, Japan

[21] Appl. No.: 282,626

[22] Filed: Dec. 9, 1988

[30] Foreign Application Priority Data

Dec. 26, 1987 [JP] Japan .................. 62-328399
Feb. 16, 1988 [JP] Japan .................. 63-31823
Oct. 25, 1988 [JP] Japan .................. 63-267051

[51] Int. Cl.⁴ .................................. H01R 4/64
[52] U.S. Cl. ........................... 439/191; 439/248;
439/251; 439/817; 901/50
[58] Field of Search .................... 439/190–195,
439/246–248, 251, 817, 820; 285/131; 901/28,
30, 31, 41, 50

[56] References Cited

U.S. PATENT DOCUMENTS 2,379,226  6/1945  Frey ........................ 439/191
4,525,918  6/1985  Puritz ...................... 439/191

FOREIGN PATENT DOCUMENTS 922558  4/1963  United Kingdom ............. 439/246

Primary Examiner—Neil Abrams
Attorney, Agent, or Firm—Flynn, Thiel, Boutell & Tanis

[57] ABSTRACT

A tool changer for welding robot comprising: detachable male portions of connectors provided at a substrate fixed to a robot arm side for supplying electricity, gas, air, water to the tool side from the robot arm side; and detachable female portions of connectors to be connected to the male portions of the connectors and provided at a substrate fixed to a tool side for receiving electricity, gas, air, water from the male portions of connectors, each female portion composed of the connector, a protective tube provided at the substrate fixed to the welding gun side, a coupler inserted inside thereof, and an O-ring provided between the protective tube and the coupler, wherein the connector and the coupler are integrally formed and are radially slidable within the protective tube around the O-ring. A transformer is provided centrally of the connectors on the robot arm side substrate.

11 Claims, 8 Drawing Sheets

TOOL CHANGER FOR WELDING ROBOT

BACKGROUND OF THE INVENTION

1. Field of the Invention

The present invention relates to an improvement of a tool changer for a welding robot which is adapted to supply electricity, gas, air, water and the like to a tool such as a welding robot gun.

2. Description of the Prior Art

A tool changer for welding robot of this type is known as illustrated in FIG. 10. The prior tool changer for welding robot will be described hereunder with reference to FIG. 10. The prior tool changer for welding robot comprises a base 131 connected to a welding robot arm (not shown), an absorbing plate 133 supported by the substrate 131 via piano lines at three points thereof for absorbing a lateral displacement of movement of a holding plate 137, the holding plate 137 supported by the absorbing plate 133 via piano lines 134 at three points thereof for holding a guide pin 135 and a connector 136 (for supplying electricity, gas, air, water), and other substrate 138 provided with female portions 139, 140 respectively for receiving the guide pin 135 and the connector 136.

With the arrangement of the prior tool changer for welding robot the other substrate 138 is moved close to the substrate 131 so that the guide pin 135 is inserted into the female portion 139 whereby the connector 136 can be inserted into the female portion 140. Even if there is any displacement or positional error between the guide pin 135 and the connector 136 or between the female portions 139, 140, the displacement or positional error therebetween (lateral or oblique direction) can be absorbed by the piano lines whereby the connector can be connected in place.

However, there are following problems in the prior tool changer for welding robot.

(1) There are provided a plurality of piano lines at the base side, where the guide pin and the connector are provided, for absorbing the displacement or positional error and the like so that the construction thereof becomes complex with high cost in manufacturing thereof.

(2) Various connectors depending on the various purposes at the tool side are provided both at the side of the tool or the welding gun and the side of the robot arm whereby a considerable cost, and a facility to be involved in the provision thereof are required as well as laborious and inefficient replacement thereof.

(3) Furthermore, according to the tool changer for welding robot having the transformer at the side of the tool side the tool changer per se is bulky as a whole of the tool changer and is positioned high in the center of gravity thereof which causes the tool changer to be unstable.

It is therefore an object of the present invention to provide a tool changer for a welding robot provided with a displacement or a positional error absorbing unit at the female portion thereof to overcome the problem as set forth above (1), connectors unitized in plural numbers and detachably mounted on the base or the substrate to overcome the problem as set forth above (2), and a transformer centrally disposed between the connectors to overcome the problem as set forth above (3).

A tool changer for a welding robot comprises male portions of connectors provided at a substrate fixed to a robot arm side for supplying electricity, gas, air, and water to the tool side from the robot arm side; and female portions of connectors to be connected to the male portions of the connectors and provided at a substrate fixed to a tool side for receving electricity, gas, air, and water from the male portions of connectors, each female portion composed of the connector, a protective tube provided at the substrate fixed to the welding gun side, a coupler inserted inside thereof, and an O-ring provided between the protective tube and the coupler, wherein the connector and the coupler are integrally formed and are radially slidable within the protective tube around the O-ring.

The above and other objects, features and advantages of the present invention will become more apparent from the following description taken in conjunction with the accompanying drawings.

DESCRIPTION OF THE PREFERRED EMBODIMENT

Figure 1:
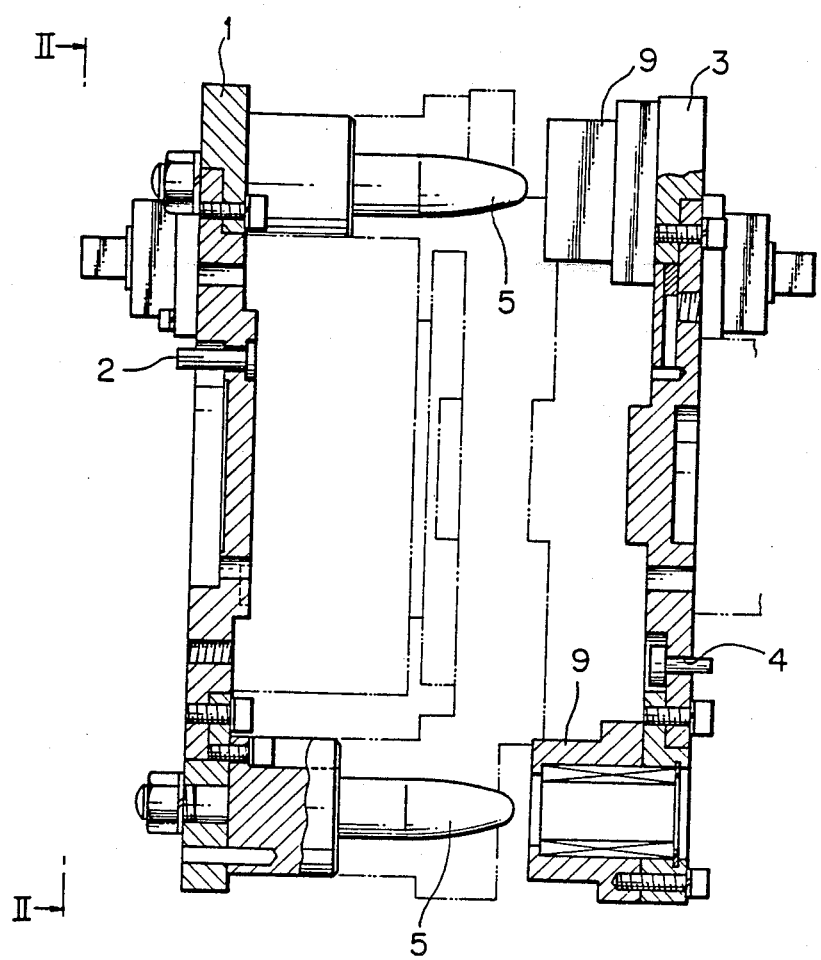
FIG. 1 is a side elevational view of a tool changer for and welding robot according to a first embodiment of the present invention.
Figure 2:
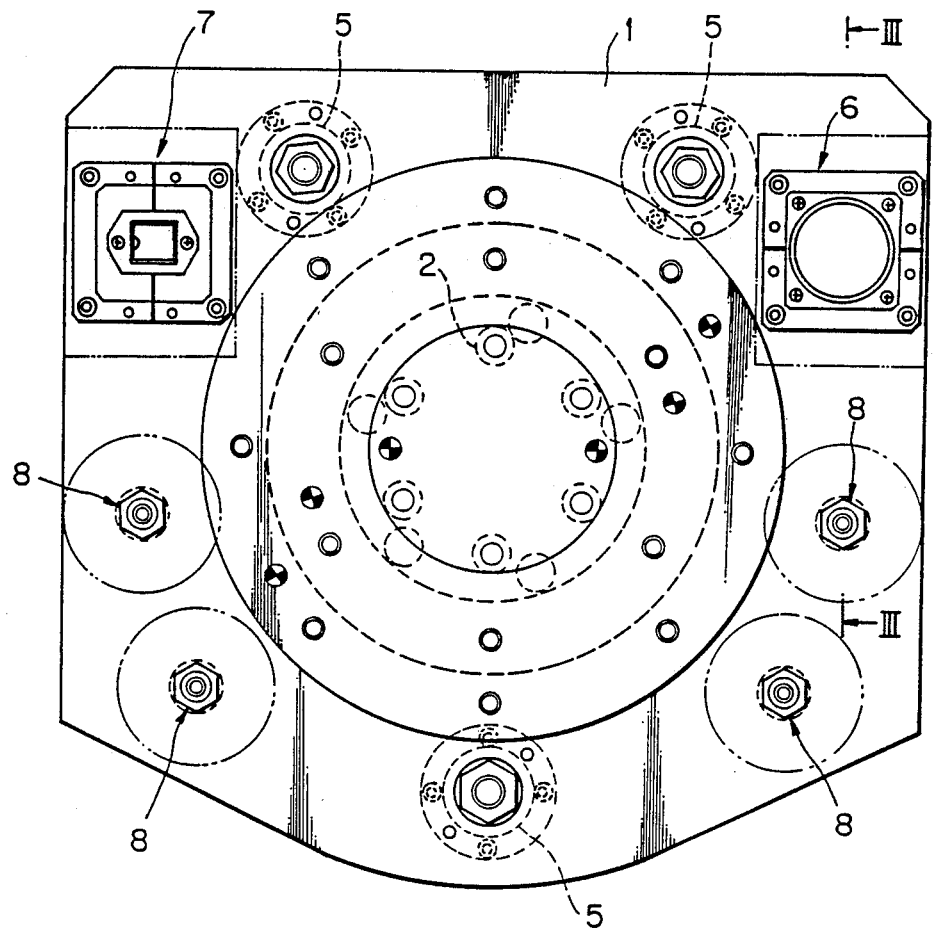
FIG. 2 is a view taken along II—II of FIG. 1.
Figure 3:
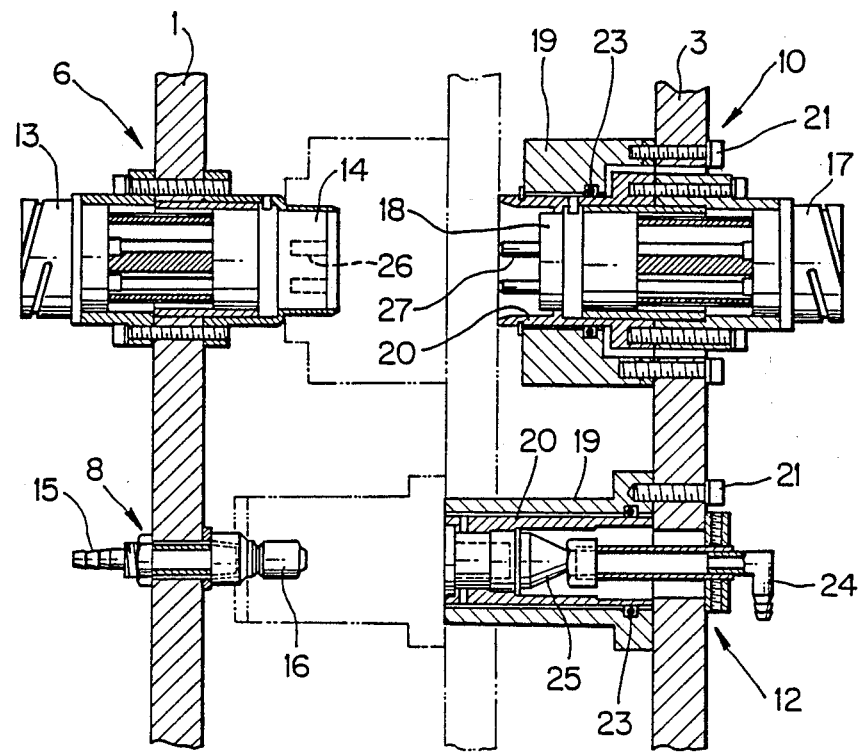
FIG. 3 is a cross sectional view taken along III—III of FIG. 2.

First Embodiment (FIGS. 1 through 3):

A tool changer for a welding robot according to a first embodiment of the present invention will be described with reference to FIGS. 1 through 3.

Designated at 1 is a substrate or base plate fixed to a robot arm side (not shown) via pins 2, 2 . . . , 3 is a substrate or base plate fixed to a welding gun side (not shown) via pins 4, 4 . . .

The substrate 1 has a male portion comprising three guide pins 5 for precisely positioning the substrates 1, 3, a power connector 6, a control connector 7, and four cold water supply connectors 8. The substrate 3 has a female portion comprising guide pin receivers 9, a connector receiver 10 for receiving the power connector 6, a control connector 11 for receiving the control connector 7 and cold water supply connector receivers 12 for receiving the cold water supply connectors 8.

The power connector 6 provided at the substrate 1 comprises a pin connector 13 projected toward the robot arm side and a socket connector 14 projected toward the substrate 3 while each cold water supply connector 8 comprises a connecting tube 15 projected toward the robot side and provided at one end thereof and connected to a hose (not shown) and a valve 16 projected toward the substrate 3 at the other end thereof.

The power connector receiver 10 provided at the substrate 3 comprises a socket connector 17 projected toward the welding gun side and a pin connector 18 projected toward the substrate 1 while the power connector receiver 10 is housed in couplers 20 inserted at a predetermined interval within protective tubes support sleeves 19. The protective tubes 19 are fixed to the substrate 3 through bolts 21 while O-rings 23 are provided at the portion adjacent to the substrate 3 between the protective tubes 19 and couplers 20. The connector and the coupler 20 are integrally formed and are slightly radially movable within the protective tube 19 on the surrounding O-ring 23. Each of the cold water supply connector receivers 12 comprise a connecting tube 24 provided at one end thereof and connected to a hose (not shown) and a valve 25 provided at the other end thereof while each of the cold water supply connector receivers 12 is also housed in each coupler 20 inserted at a predetermined interval within protective tubes 19.

Since the control connectors are substantially the same as the power connectors, the explanation thereof will be omitted.

With the arrangement of the tool changer for a welding robot according to the first embodiment of the present invention, the substrates 1, 3 respectively fixed to the robot arm side and the welding gun side via bolts 2, 4 are brought together so that the guide pins 5 provided at the substrate 1 are inserted into the guide pin receivers 9 provided at the substrate 3 whereby connectors 6, 7, 8 comprising the male portions provided at the substrate 1 for supplying electricity, cold water, and the like are to be connected to the connectors 10, 11, 12 comprising the female portions. However, if the positional relation between the guide pins 5 and the guide pin receivers 9, connectors 6, 7, 8 of the male portion and the connectors 10, 11, 12 of the female portions are not set in place, the male and the female portions are not positioned in place to be connected to each other.

If the connector 6 and the connector 10 are displaced slightly, it is always difficult to insert the socket connector 14 into the female portion so that holes 26 of the socket connector 14 can not be connected to pins 27 of the pin connector 18. However, according to the present invention, inasmuch as tip ends of the couplers 20 of the female portion are slightly swingably or swivelably provided within the protective tubes 19 on the surrounding O-rings 23, the displacement or positional error between the connector 6 and the connector 10 is absorbed by forcibly moving the tip ends of the couplers 20 to thereby connect both the connectors 6, 10. Similarly, in case that the connectors 7, 11 are slightly displaced, or the connectors 8, 12 are slightly displaced, the displacement thereof will be absorbed in the same manner as the case of the displacement of the connectors 6, 10.

The first embodiment of the present invention described with reference to connectors between the electricity and water but it is of course applied to connections between gas, air and the like depending on tools to be used.

It is of course natural that the male and female portions of connectors can be provided vice versa, namely, the male portions of connectors can be provided at the substrate fixed to the tool side such as the welding gun side while the female portions of connectors are provided at the substrate fixed to the robot arm side.

Second Embodiment (FIGS. 4 through 7):

A tool changer for a welding robot according to a second embodiment of the present invention will be described with FIGS. 4 through 7.

According to the second embodiment, connectors are unitized in the plural numbers and detachably mounted on each substrate. In the figures, designated at 31 is a substrate fixed to an end of a robot arm side and 32 is a substrate fixed to a side of a tool, for example, a welding gun. The substrate 31 has thereon a cylindrical coupler 34 defining a concave 33 at the central portion thereof. fixing elements 35 through 38 fixed radially at the circumference of the coupler 34 and guide pins 39 and 40 fixed to fixed elements 35, 36. The substrate 32 has thereon a female coupler 42 provided with a projection 41 to be engaged in the concave 33, fixing elements 43 through 46 fixed radially at the circumference of the female coupler 42, and guide pin receivers 47, 48 for receiving the guide pins 39, 40 fixed to the fixed elements 43, 44.

Figure 4:
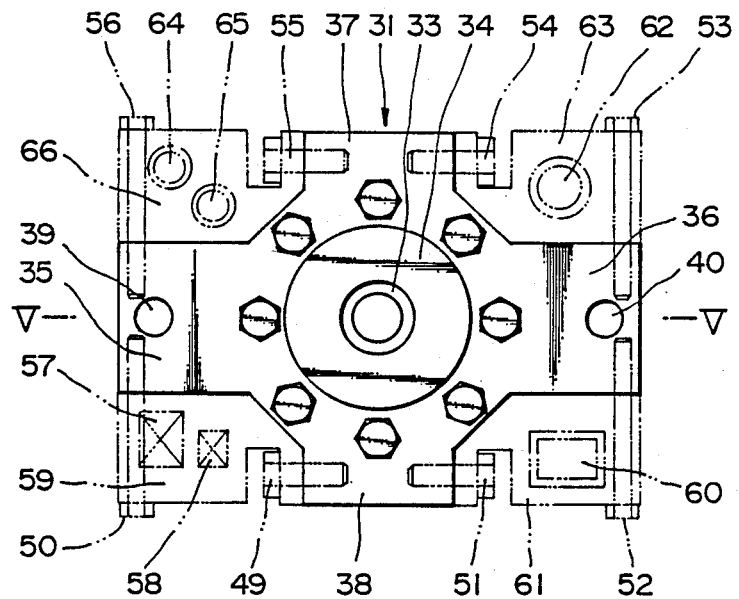
FIG. 4 is a front elevational view of a substrate, disposed at the robot arm side, of a tool changer for a welding robot according to a second embodiment of the present invention.
Figure 5:
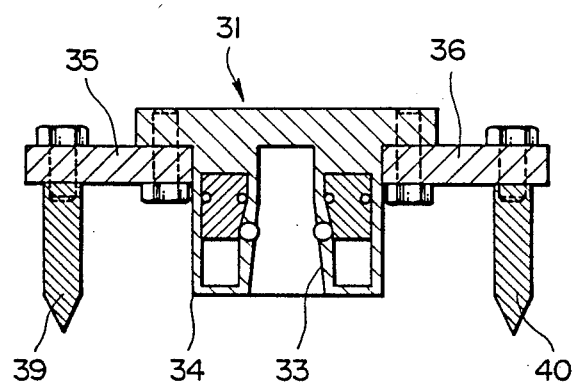
FIG. 5 is a cross sectional view taken along V—V of FIG. 4.

As illustrated in an imaginary line of FIG. 4, provided detachably between the fixed elements 35, 38; 38, 36; 36, 37; and 37, 35 of the substrate 31 are a plurality of unitized male connectors which are respectively fixed to the fixed elements, for example, by bolts 49, 50; 51, 52; 53, 54; and 55, 56. A plurality of male connectors, namely, the units comprise connectors 57, 58 (having inside thereof pins for supplying a low voltage current), a connector unit 59, a connector 60 (having inside thereof a pin for supplying a high voltage current), a connector unit 61, a connector 62 (having inside thereof a tube for supplying gas), a connector unit 63, connectors 64, 65 (having inside thereof cold water passages), and a connector unit 66.

Figure 6:
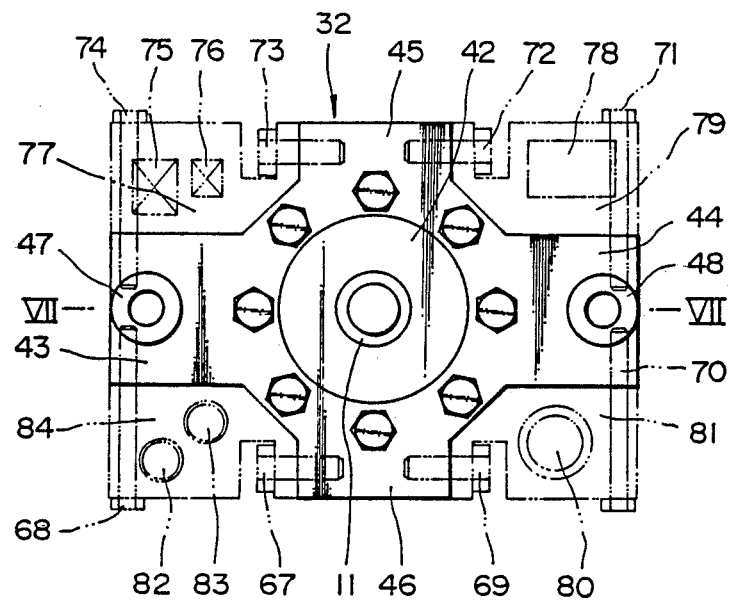
FIG. 6 is a front elevational view of a substrate, disposed at the tool side, of a tool changer for a welding robot according to a second embodiment of the present invention.
Figure 7:
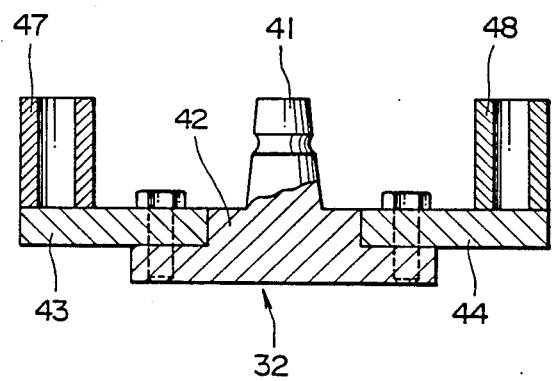
FIG. 7 is a cross sectional view taken along VII—VII of FIG. 6.

As illustrated in an imaginary line of FIG. 6, provided detachably between the fixed elements 43, 46; 46, 44; 44, 45; and 45, 43 of the substrate 32 are a plurality of unitized connectors which are respectively fixed to the fixed elements, for example, by bolts 67, 68; 69, 70; 71, 72; and 73, 74.

A plurality of female connectors, namely, the units comprise, for example, a connector 75, a connector 76 (having therein pins for receiving a low voltage current), a unit 77, a connector 78 (having therein a pin for receiving a high voltage current), a unit 79, a connector 80 (having therein a tube for receiving gas), a unit 81, connecotors 82, 83 (having therein cold water passage for receiving cold water), and a unit 84.

Connectors 57 and 75, 58 and 76, 60 and 78, 62 and 80, 64 and 82, and 65 and 83 are respectively connected to each other.

With the arrangement of the tool changer for a welding robot according the second embodiment of the present invention, the substrates 31 and 32 are brought together so that the guide pins 39, 40 are inserted into the guide pin receivers 47, 48. With the insertion of the guide pins 39, 40, each male portion of each connector is guided to thereby engage in each female connector while the projection 41 is engaged in the concave 33 so that the both substrates 31, 32 are completely connected to each other. Hence, two kinds of low voltage currents are supplied from the unit 59 to the unit 77 and high voltage current is supplied from the unit 61 to the unit 79 while gas is supplied from the unit 63 to the unit 81 and two kinds of fluids are supplied from the unit 66 to the unit 84. When there is any alteration of usage at the tool side, for example, two kinds of high voltage currents are intended to be used among electricity, gas, air, water, the units 61 and 79 are removed to replace with the unit provided with the connectors for supplying two kinds of high voltage currents while the other remaining units are kept as they are.

According to the tool changer for a welding robot according to the second embodiment of the present invention, because the terminal is shaped substantially rectangular, each unit may be, for example, square or fan shaped. The number of units is four which may be optionally selected.

Third Embodiment (FIGS. 8 and 9):

A tool changer for a welding robot according to a third embodiment of the present invention will be described with reference to FIGS. 8 and 9.

According to the tool changer, a transformer is disposed in the central portion of the connectors and secondary terminals of the transformer and terminals of the welding gun side are connected to eath other when the connectors of each side are connected to each other.

Figure 8:
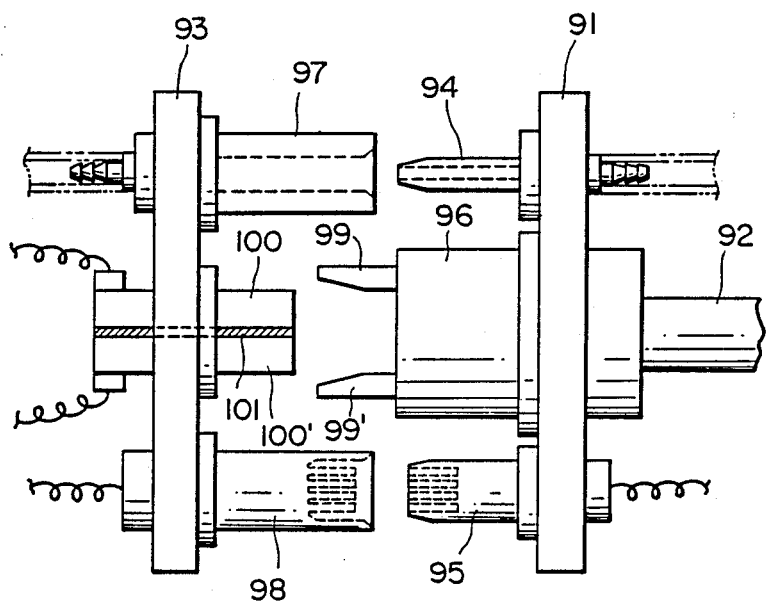
FIG. 8 is a side elevational view of a tool changer for a welding robot according to a third embodiment of the present invention.

In FIG. 8, designated at 91 is a substrate fixed to a terminal of robot arm 92, 93 is a substrate fixed to a tool side, for example, a welding gun side (not shown).

The substrate 91 has a male portion comprising a connector 94 (having therein a cold water passage) serving also as a guide pin for positioning the substrates 91, 93 and projected connectors 95, 95 . . . for supplying electricity, gas, air, and the like. These connectors are arranged at both sides of a transformer 96 fixed to the substrate 91.

The substrate 93 has female portions comprising a connector 97 (having therein a cold water passage) serving also as a guide pin for positioning the substrates 91, 93 and projected connectors 98, 98 . . . for receiving electricity, gas, air, and the like. Welding gun terminals 100, 100' to be connected to secondary terminals 99, 99' of the transformer 96 are fixed to the substrate 93, and intervening therebetween is an insulated plate 101. Accordingly, at the state where the substrates 91, 93 are respectively fixed to the robot arm side and the welding gun side, the substrates 91, 93 are brought together so that the connector 94 serving also as the guide pin provided at the substrate 91 is inserted into the connector 97 serving also as the guide pin receiver provided at the substrate 93 whereby the cold water passage is defined while the other connectors 95, 95 . . . 98, 98 . . . are respectively conencted to each other for defining passages for supplying electricity, gas, air, and the like. Simultaneously with the connections of these connectors the secondary terminals 99, 99' of the transformer 96 are respectively connected to the terminals 100, 100' of the welding gun side.

Figure 9:
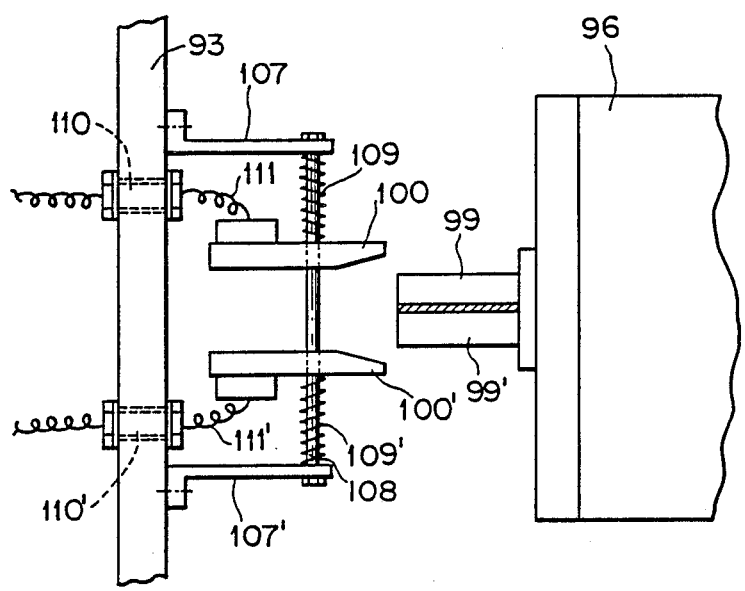
FIG. 9 is a side elevational view of assistance in explaining the positional relation between a secondary terminal of a transformer and a welding gun terminal.
Figure 10:
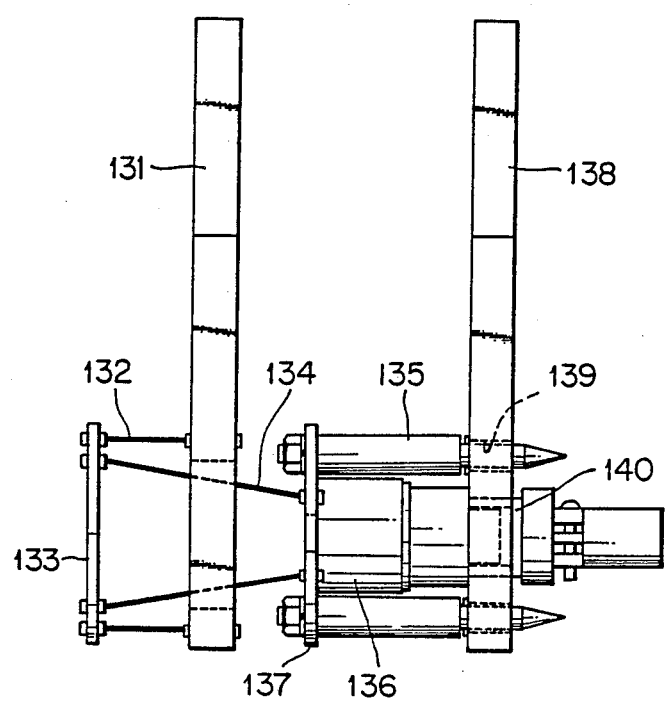
FIG. 10 is a view of assistance in explaining a prior tool changer for a welding robot.

FIG. 9 shows a modified example of connections between the secondary terminals 99, 99' of the transformer 96 and the terminals 100, 100' of the welding gun side. In the same figure, stays 107, 107' are fixedly mounted on the substrate 93 and a shaft 108 provided between the stays 107, 107' has terminals 100, 100' mounted thereto while springs 109, 109' are respectively disposed between the stay 107 and the terminal 100 of the welding gun side, and between the stay 107' and the terminal 100' of the welding gun side which respectively urge the terminals 100, 100' of the welding gun side together. The terminals 100,100' have, at one end, mutually facing surfaces which incline away from each other.

Provided at the terminals 100, 100' of the welding gun side are electric wires 111, 111' to be connected to coupling terminals 110, 110' provided at the substrate 93. Accordingly, when both the substrates 91, 93 are brought together, the secondary terminals 99, 99' of the transformer 96 contact the terminals 100,100', respectively, and press against the urging force or spring force of the springs 109, 109' whereby the secondary terminals 99, 99' and the terminals 100, 100' of the welding gun side are automatically completely connected to each other. According to the modified example there described, the connector 94 serves as the guide pin for supplying water or electricity but the connector 94 can be used for supplying gas or air and the like depending on the usage of the tool.

Referring to FIGS. 1 through 9, it is to be understood with ease that the aforesaid connectors are unitized in the plural numbers and detachably mounted on each substrate whereby the transformer centrally disposed between the connectors and the secondary terminals of the transformer are connected to the terminals of the welding gun side at the time of connection between the connectors.

According to the present invention, if the position is approximately determined by a positioning member when the connectors are connected to each other, the connectors can be precisely connected to each other even if there is any displacement or positioning error between the connectors, and the displacement or positioning error can be absorbed with provision of simple construction, namely, by the O-ring provided at the female portion. Thus, the tool changer for welding robot can be manufactured simply with low cost without resorting to a precise process.

Furthermore, by utilizing the connectors in plural numbers and mounting detachably each unitized connector on each substrate, the unitized connector depending on the use at the of tool side can be replaced with other unitized connectors very easily, whereby a working efficiency thereof is improved and installation cost thereof will be reduced.

Still furthermore, if the transformer is disposed centrally of the connectors and the secondary terminals of the transformer are connected to the terminal of the welding gun side at the time of connection between the connectors, the tool changer size can be reduced and its center of gravity lowered, which makes the tool changer stable.

Additionally still furthermore, if the connectors are unitized in the plural number and detachably mounted on each substrate while the transformer is disposed centrally of the connectors and the secondary terminals of the transformer are connected to the terminal of welding gun side at the time of connection between the connectors, the unitized connector depending on the use of tool side can be replaced with other unitized connectors very easily and the tool changer size can be reduced and its center of gravity lowered, which makes the tool changer stable.

Although the invention has been described in its preferred form with a certain degree of particularity, it is to be understood that many variations and changes are possible in the invention without departing from the scope thereof.

What is claimed is:

1. A tool changer for a welding robot, comprising:
   a first base plate associated with a robot arm and a second base plate associated with tool member, a plurality of first connector parts supported on said first base plate and extending therethrough, said first connector parts being adapted to supply at least one of electricity, gas and water to the tool member from the robot arm, a plurality of second connector parts supported on said second base plate and extending therethrough, said second connector parts being adapted to receive at least one of electricity, gas and water from said first connector parts, each said first connector part being adapted to slidably mate with and form a connection with a respective said second connector part, said connector parts being respectively arranged on said base plates such that respective pairs of said connector parts mate when said base plates are disposed in a predetermined relationship adjacent one another; and
   an electrical transformer mounted on said first base plate associated with the robot arm, said electrical transformer being located centrally of said first connector parts, said electrical transformer having a pair of secondary terminals extending therefrom, said second base plate having a pair of electrical terminals supported thereon centrally of said second connector parts, said secondary terminals of said electrical transformer being electrically connected to said electrical terminals of said second base plate when said first connector parts mate with said second connector parts.

2. The apparatus according to claim 1, wherein said connector parts associated with one of said base plates are supported thereon by support sleeves mounted on said one base plate and having the associated said connector parts respectively disposed therein, and O-rings respectively interposed between each said support sleeve and the associated said connector part and snugly surrounding said connector part, said connector parts disposed in said support sleeves being swivelable on the associated said O-ring to facilitate said mating connection with the corresponding said connector part on the other said base plate.

3. The apparatus according to claim 2, wherein said connector parts associated with one of said base plates are male, plug-type connector parts, and wherein said connector parts associated with the other of said base plates are female socket-type connector parts, said male connector parts being received in said female connector parts when said connector parts mate, said female connector parts being swivelably disposed in said sleeves and surrounded by said O-rings.

4. The apparatus according to claim 3, wherein said first connector parts are said male, plug-type connector parts, and said second connector parts are said female, socket-type connector parts.

5. The apparatus according to claim 4, wherein groups of said connector parts are carried on platelike connector units, said connector units being detachably mounted on said base plates.

6. The apparatus according to claim 5, wherein said electrical terminals are supported on said second base plate by a pair of spaced stays fixedly mounted on and projecting from said second base plate, a shaft connected at its ends to respective said stays and extending therebetween, and coil springs arranged on said shaft at said ends thereof, said electrical terminals being carried slidably on said shaft between said springs and being spaced apart from each other, each said electrical terminal being urged along said shaft toward the other said electrical terminal by a respective said spring, said transformer secondary terminals being inserted between said electrical terminals when said electrical connection is made, said electrical terminals having mutually facing surfaces which incline away from each other in a direction from which said secondary terminals are received to facilitate receiving them therebetween, said secondary terminals being spaced apart far enough to engage against and spread said electrical terminals of said second base plate further apart against the urging of said springs such that each said electrical terminal is firmly pressed against the corresponding said secondary terminal of said transformer.

7. The apparatus according to claim 6, wherein one of said base plates includes guide pins projecting therefrom and the other of said base plates includes guide receiving openings for receiving said guide pins therein to facilitate positioning said base plates in said predetermined relationship adjacent one another to permit said connector parts to slidably mate with each other.

8. The apparatus according to claim 3, wherein said first connector parts are female, socket-type connector parts, and said second connector parts are male, plug-type connector parts.

9. The apparatus according to claim 8, wherein groups of said connector parts are carried on platelike connector units, said connector units being detachably mounted on said base plates.

10. The apparatus according to claim 9, wherein said electrical terminals are supported on said second base plate by a pair of spaced stays fixedly mounted on and projecting from said second base plate, a shaft connected at its ends to respective said stays and extending therebetween, and coil springs arranged on said shaft at said ends thereof, said electrical terminals being carried slidably on said shaft between said springs and being spaced apart from each other, each said electrical terminal being urged along said shaft toward the other said electrical terminal by a respective said spring, said transformer secondary terminals being inserted between said electrical terminals when said electrical connection is made, said electrical terminals having mutually facing surfaces which incline away from each other in a direction from which said secondary terminals are received to facilitate receiving them therebetween, said secondary terminals being spaced apart far enough to engage against and spread said electrical terminals of said second base plate further apart against the urging of said springs such that each said electrical terminal is firmly pressed against the corresponding said secondary terminal of said transformer.

11. The apparatus according to claim 10, wherein one of said base plates includes guide pins projecting therefrom and the other of said base plates includes guide receiving openings for receiving said guide pins therein to facilitate positioning said base plates in said predetermined relationship adjacent one another to permit said connector parts to slidably mate with each other.

* * * * *